United States Patent [19]

Ohhashi

[11] Patent Number: 4,507,749
[45] Date of Patent: Mar. 26, 1985

[54] TWO'S COMPLEMENT MULTIPLIER CIRCUIT

[75] Inventor: Masahide Ohhashi, Sagamihara, Japan

[73] Assignee: Tokyo Shibaura Denki Kabushiki Kaisha, Japan

[21] Appl. No.: 423,246

[22] Filed: Sep. 24, 1982

[30] Foreign Application Priority Data

Dec. 10, 1981 [JP] Japan .................. 56-198853

[51] Int. Cl.³ .............................................. G06F 7/52
[52] U.S. Cl. .................................................. 364/757
[58] Field of Search ........................................ 364/757

[56] References Cited

U.S. PATENT DOCUMENTS 3,866,030 2/1975 Baugh et al. ...................... 364/757
4,086,474 4/1978 Negi et al. ........................ 364/757

OTHER PUBLICATIONS

Robertson, "Two's Complement Multiplication in Binary Parallel Digital Computers", *IRE Trans.-Electronic Computers*, Sep. 1955, pp. 118–119.
Dauby et al, "Two's Complement Multiplier", *IBM Tech. Disclosure Bulletin*, vol. 18, No. 5, Oct. 1975, pp. 1482–1483.
Capps et al, "Two's-Complement Multiplication", *IBM Tech. Disclosure Bulletin*, vol. 20, No. 12, May 1978, pp. 5292–5293.

*Primary Examiner*—David H. Malzahn
*Attorney, Agent, or Firm*—Finnegan, Henderson, Farabow, Garrett & Dunner

[57] ABSTRACT

A multiplication circuit includes a multiplying unit for multiplying a signed multiplier X represented in terms of the two's complement of n bits by a signed multiplicand Y represented in terms of two's complement of n bits to generate a signed multiplication output data of $(2n-1)$ bits represented in terms of the two's complement, an exclusive-OR circuit for producing the exclusive-OR of the sign bits $X_S$ and $Y_S$ of the respective values X and Y, and a selecting circuit for generating a sign bit "0" when the most significant bit of the multiplication output data from the multiplying unit is "0" and generating as a sign bit an output bit of the exclusive-OR circuit when the most significant bit is "1".

5 Claims, 3 Drawing Figures

TWO'S COMPLEMENT MULTIPLIER CIRCUIT

BACKGROUND OF THE INVENTION

The present invention relates to a digital multiplication circuit for multiplying a signed multiplier by a signed multiplicand represented in terms of the two's complement based on a binary code.

The multiplicand Y and the multiplier X which each have n bits and are represented in terms of the two's complement can be expressed by the following equation:

$$X = -X_S \cdot 2^{n-1} + X^* \quad (1)$$

$$Y = -Y_S \cdot 2^{n-1} + Y^* \quad (2)$$

where $X^*$ and $Y^*$ respectively indicate the numeral sections of binary codes X and Y of the type represented in terms of the two's complement, and accordingly the $X^*$ and $Y^*$ can be expressed by the following equations:

$$X^* = \sum_{i=1}^{n-1} X_i \cdot 2^{i-1},$$

$$Y^* = \sum_{i=1}^{n-1} Y_i \cdot 2^{i-1}$$

Further, $X_S$ and $Y_S$ are sign bits, and become "0" when positive and become "1" when negative.

The product X·Y can be given by the following equation:

$$\begin{aligned}X \cdot Y &= (-X_S \cdot 2^{n-1} + X^*)(-Y_S \cdot 2^{n-1} + Y^*)\\ &= X_S \cdot Y_S \cdot 2^{2n-2} + X^* \cdot Y^* - X_S \cdot Y^* \cdot 2^{n-1}\\ &\quad - Y_S \cdot X^* \cdot 2^{n-1}\end{aligned} \quad (3)$$

Assume that the binary numerals which are obtained by inverting the bits of the $X^*$ and $Y^*$ are respectively represented by $\overline{X}^*$ and $\overline{Y}^*$, and the eq. (3) can be rewritten as below.

$$\begin{aligned}X \cdot Y &= (X^* \cdot Y^*) + X_S \cdot 2^{n-1}(\overline{Y}^* - 2^{n-1} + 1) +\\ &\quad Y_S \cdot 2^{n-1}(\overline{X}^* - 2^{n-1} + 1) + X_S \cdot Y_S \cdot 2^{2n-2}\\ &= (X^* \cdot Y^*) + X_S \cdot \overline{Y}^* \cdot 2^{n-1} + Y_S \cdot \overline{X}^* \cdot 2^{n-1} +\\ &\quad X_S \cdot 2^{n-1} + Y_S \cdot 2^{n-1} + 2^{2n-2}(X_S \cdot Y_S - X_S - Y_S)\end{aligned} \quad (4)$$

As evident from the above eq. (4), in order to obtain the product X·Y, it is necessary to correct the first term $(X^* \cdot Y^*)$ with the second and following terms. In other words, it is necessary to add the terms $(X_S \cdot \overline{Y}^* \cdot 2^{n-1})$, $(Y_S \cdot \overline{X}^* \cdot 2^{n-1})$, $(X_S \cdot 2^{n-1})$ and $(Y_S \cdot 2^{n-1})$ to the first term $(X^* \cdot Y^*)$ and to further add the last term $2^{2n-2} \cdot (X_S \cdot Y_S - X_S - Y_S)$. Since the last term $2^{2n-2} \cdot (X_S \cdot Y_S - X_S - Y_S)$ should, however, become 0 or $-2^{2n-2}$, the addition of the term $2^{2n-2}(X_S \cdot Y_S - X_S - Y_S)$ can be generally executed by setting the logical sum of the sign bits $X_S$ and $Y_S$ at the $(2n-1)$th bit position, i.e., the next bit position of the most significant bit position, of the added result of the term $\{(X^* \cdot Y^*) + X_S \cdot \overline{Y}^* \cdot 2^{n-1} + Y_S \cdot \overline{X}^* \cdot 2^{n-1} + X_S \cdot 2^{n-1} + Y_S \cdot 2^{n-1}\}$.

The following conditional inequalities can be obtained from the eq. (1) and (2):

$$2^{n-1} - 1 \geq X \geq -2^{n-1} \quad (5)$$

$$2^{n-1} - 1 \geq Y \geq -2^{n-1} \quad (6)$$

The following conditional inequality can be introduced from the above conditional inequalities (5) and (6).

$$2^{2n-2} \geq X \cdot Y - 2^{2n-2} + 2^{n-1} = -2^{2n-1} + (2^{2n-2} + 2^{n-1}) \quad (7)$$

In other words, when the most significant bit M0 of the product X·Y is used as a sign bit and the numeral section of the product X·Y is represented by the bit M1 to M(2n−1), the following conditional inequality can be obtained:

$$\underbrace{010\ldots 0}_{(2n-1)} \geq X \cdot Y \geq \underbrace{110\ldots 0}_{(n-2)}\underbrace{10\ldots 0}_{(n-1)} \quad (8)$$

In the inequality (8) described above, "0" in the most significant bit position to the left side indicates that the binary numeral of the following $(2n-1)$ bits of the left side is positive, while "1" in the most significant position of the right side indicates that the $(2n-1)$-bit binary numeral represented in terms of the two's complement except the most significant bit "1" of the right side is negative. Further, "1" in the n-th bit position of the right side represents $2^{n-1}$ in the right side of the inequality (7). In the inequality (7) described above, $X \cdot Y = 2^{2n-2}$ can be obtained in case of $X = Y = -2^{n-1}$. That is, there is no possibility that the most significant bit M0 of the product X·Y becomes "0" and at the same time the bit M1 becomes "1" in the $(2n-1)$th bit position except in case of $X = Y = -2^{n-1}$.

In addition, the following inequality (9) can also be obtained from the inequality (7):

$$\begin{aligned}X \cdot Y &\geq -2^{2n-2} + 2^{n-1} = -2^{2n-1} + (2n^{2n-2} + 2^{n-1})\\ &> -2^{2n-1} + (0 + 2^{2n-3} + 2^{2n-4} + \ldots + 2^0)\end{aligned} \quad (9)$$

As evident from the inequality (9) described above, there is as well no possibility that, when the most significant bit M0 of the product X·Y is "1", the bit M1 in the $(2n-1)$th bit position becomes "0".

According to the above technical background, in the conventional array type digital multiplication circuit for executing the multiplication of the signed binary numerals X and Y of n bits indicated by the two's complement, input binary data X and Y are so limited as to exclude the case where the most significant bit M0 of the multiplied result and the bit M1 in the $(2n-1)$th bit position do not take the same value, i.e., where the binary numerals X and Y both take the value of $-2^{n-1}$. However, such a limit on the input binary data would restrict the function of the digital multiplication circuit. It has been considered that a complicated input circuit would be required in order to operate this digital multiplication circuit normally even when input binary data X and Y are simultaneously $-2^{n-1}$.

SUMMARY OF THE INVENTION

It is an object of the present invention to provide a digital multiplication circuit which is capable of obtaining an adequately multiplied result even when input binary data X and Y are simultaneously $-2^{n-1}$.

In one embodiment of the present invention, a digital multiplication circuit comprises multiplication means for multiplying a multiplier X of a signed n-bit binary code represented in terms of the two's complement by a multiplicand of a signed n-bit binary code represented in terms of the two's complement Y to thereby generate a multiplication output data of binary code represented in terms of the two's complement, sign bit generating means for generating an output bit "0" when the sign bit $X_S$ of the multiplier X, the sign bit $Y_S$ of the multiplicand Y and a bit M1 in a (2n−1)th bit position from the least significant bit position of the multiplication output data from said multiplication means are all "1" and generating an output bit equal to the (2n−1)th bit M1 when at least one of the bits $X_S$, $Y_S$ and M1 is "0", thereby generating the multiplication output data from said multiplication means as numeral section and generating the output bit from said sign bit generating means as a sign bit.

DETAILED DESCRIPTION OF THE PREFERRED EMBODIMENTS

The present invention will now be described in more detail with reference to the accompanying drawings.

A bit M0 in the most significant bit position or 2n-th bit position of a product X·Y of 2n bits and a bit M1 in the (2n−1)th bit position may take the values in accordance with input binary numerals X and Y as shown in the following Table I.

TABLE I

| X | $-2^{n-1}$ | >0 (or 0<) | 0 |   | >0 | <0 |
|---|---|---|---|---|---|---|
| Y | $-2^{n-1}$ | <0 (or 0>) |   | 0 | >0 | <0 |
| M0 | 0 | 1 | 0 | 0 | 0 | 0 |
| M1 | 1 | 1 | 0 | 0 | 0 | 0 |

In this manner, in case of $X=Y=-2^{n-1}$, as described above with reference to the inequality (8), M0=0 and M1=1. In a case where the binary numerals X and Y have different signs from each other, the sign bit of the product X·Y becomes "1" indicating negative, and accordingly M0=1, and M1=1. When at least one of X and Y is binary numeral 0, M1=0. In this case, as described above with reference to the inequality (9), M0=1 cannot be obtained, and therefore M0 is set to "0". When both X and Y are simultaneously positive, M1=0, The M0 is set to "0". When both X and Y are simultaneously negative except the case of $X=Y=-2^{n-1}$, M1=0 and M0=0.

From the Table I, the inventor of the present invention has determined that an adequate product X·Y could be obtained (1) by setting the most significant bit M0 to "0" when the bit M1 in the bit position next to the most significant bit of the multiplied result of the n-bit multiplier X and the n-bit multiplicand Y represented in terms of the two's complement are "0" and (2) by setting the most significant bit M0 to a value equal to the exclusive-OR of sign bits $X_S$ and $Y_S$ when the bit M1 is "1".

Figure 1:
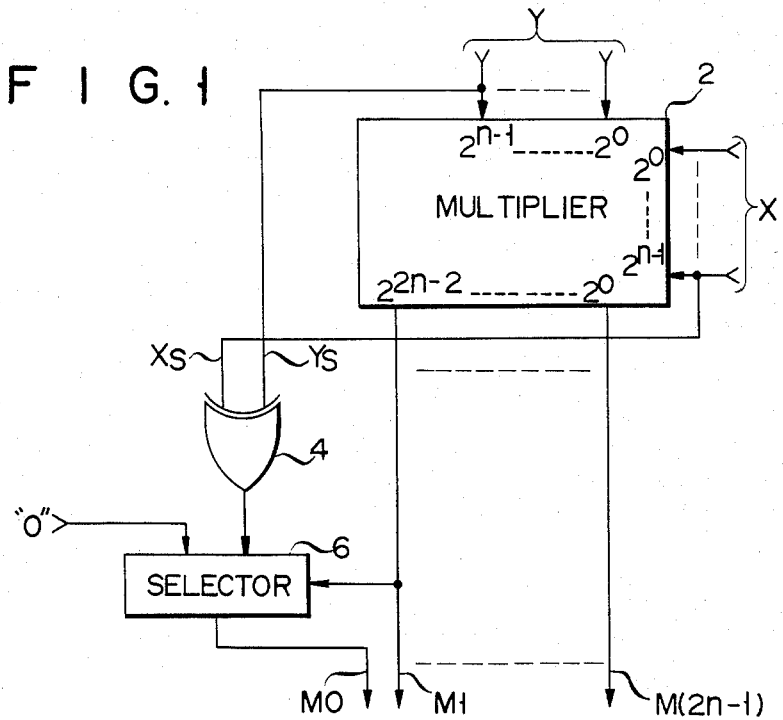
FIG. 1 is a circuit diagram showing a multiplication circuit according to a preferred embodiment of the present invention.

FIG. 1 shows a digital multiplication circuit having a suitable correcting function based on Table I according to a preferred embodiment of the present invention. This digital multiplication circuit includes an n×n bit multiplying unit 2 of, for example, an array type for generating signed binary data of (2n−1), bits indicating the product X·Y of the n-bit multiplier X and n-bit multiplicand Y indicated by the two's complement. The circuit also includes an exclusive-OR circuit 4 for generating an output signal equal to the exclusive-OR of the sign bit $X_S$ of the multiplier X and of the sign bit $Y_S$ of the multiplicand Y, and a selecting circuit for selectively generating as an output bit M0 a bit "0" or an output bit from the exclusive-OR circuit 4 in accordance with the output bit M1 from the multiplying unit 2.

When receiving the binary codes X and Y except the case of $X=Y=-2^{n-1}$, the multiplying unit 2 generates a signed binary data indicated by the two's complement having (2n−1) bits from the (2n−1)th bit M1 to the least significant bit M(2n−1) as described above with reference to the eq. (4). In this case, the (2n−1)th bit is a sign bit and the remaining (2n−2) bits represent a numeral section of the product X·Y. Further, when receiving the binary bodes X and Y both corresponding to the value of $-2^{n-1}$, the multiplying unit 2 generates a binary data of (2n−1) bits representing a numeral section of the product X·Y. In this case, no sign bit is produced from the multiplying unit 2. The exclusive-OR circuit 4 generates an output bit "0" when both the multiplier X and the multiplicand Y are positive or negative, i.e., both the sign bits $X_S$ and $Y_S$ are "0" or "1", and generates an output bit "1" when one of the multiplier X and the multiplicand Y is positive or 0 and the other is negative, i.e., one of the sign bits $X_S$ and $Y_S$ is "0" and the other is "1". The selecting circuit 6 generates as the most significant bit M0 an output bit "0" when the output bit M1 from the multiplying unit 2 is "0", and selects as the most significant bit M0 the output bit of the exclusive-OR circuit 4 when the output bit M1 is "1".

Figure 2:
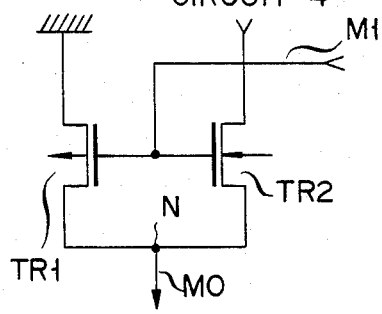
FIG. 2 is a circuit diagram showing a selecting circuit used for the multiplication circuit illustrated in FIG. 1.

FIG. 2 shows an example of the detail construction of the selecting circuit illustrated in FIG. 1. This selecting circuit 6 includes a p-channel MOS transistor TR1 whose current path is coupled between a node N and the ground, and an n-channel MOS transistor TR2 whose current path is coupled between the output terminal of the exclusive-OR circuit 4 and the node N. The M1 bit output terminal of the multiplying unit 2 is connected to the gates of these MOS transistors TR1 and TR2.

Assume, in this example, that logic levels "0" and "1" respectively correspond to high and low levels of a signal. In this case, when the output bit M1 from the multiplying units 2 is "0" in the digital multiplication circuit in FIGS. 1 and 2, the MOS transistors TR1 and TR2 are respectively rendered conductive and nonconductive. Accordingly, the output bit M0 of "0" is generated from the selecting circuit 6. When the output bit M1 of the multiplying unit 2 is "1", the MOS transistors TR1 and TR2 are respectively rendered conductive and nonconductive. Accordingly, the output bit of the exclusive-OR circuit 4 is selected as the most significant bit M0 from the selecting circuit 6. In other words, in case of $X=Y=-2^{n-1}$, both the sign bits $X_S$ and $Y_S$ are "1". Accordingly, an output bit "0" is generated from the exclusive-OR circuit 4, and the most significant bit "0" eventually generated from the selecting circuit. When one of the X and Y is positive and the other is negative, one of the sign bits $X_S$ and $Y_S$ becomes "0" and the other becomes "1". Accordingly, an output bit "1" is generated from the exclusive-OR circuit 4, and the most significant bit M0 of "1" is eventually generated from the selecting circuit 6.

In this manner, in the digital multiplication circuit, the output bits M1 to M(2n−1) from the multiplying unit 2 are used to represent the numeral section and the most significant bit M0 from the selecting circuit 6 is used to represent the sign and the most significant bit M0 and the output bits M1 to M(2n−1) are combined to produce the multiplied result which is properly corrected.

Figure 3:
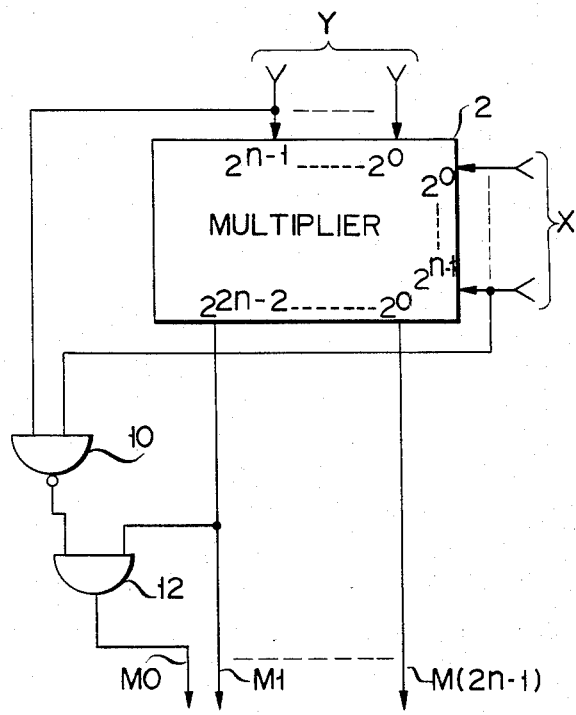
FIG. 3 is a circuit diagram showing a multiplication circuit according to another preferred embodiment of the present invention.

The present invention has been described with a preferred embodiment, but the present invention is not limited to the particular embodiment described above. Various other changes and modifications may be made within the spirit and scope of the present invention. The most advantageous features of the present invention reside in the facts that, when both the sign bits $X_S$ and $Y_S$ of the binary numerals X and Y are "1" and the bit M1 is "1", the most significant bit M0 is set to "0" and in the other cases, the most significant bit M0 is set to a value equal to the bit M1. Therefore, as shown, for example, in FIG. 3, a similar effect to the above can also be attained by employing instead of the exclusive-OR circuit 4 and the selecting circuit 6, a NAND gate 10 for receiving bits $X_S$ and $Y_S$ and an AND gate 12 for receiving the output bit of the NAND gate 10 and the bit M1 and generating an output bit M0.

What is claimed is:

1. A digital multiplication circuit comprising:
   multiplication means for multiplying a multiplier X of a signed binary code represented in terms of the two's complement of n bits by a multiplicand Y of a signed binary code represented in terms of the two's complement of n bits to thereby generate a multiplication output data of binary code represented in terms of the two's complement;
   sign bit generating means for generating an output bit "0" when a sign bit $X_S$ of the multiplier, a sign bit $Y_S$ of the multiplicand Y and a bit M1 in a (2n−1)th bit position from the least significant bit position of the multiplication output data from said multiplication means are all "1" and generating an output bit equal to the (2n−1)th bit M1 when at least one of the bits $X_S$, $Y_S$ and M1 is "0", whereby the multiplication output data from said multiplication means is a numeral and the output bit from said sign bit generating means is a sign bit.

2. A multiplication circuit according to claim 1, wherein said multiplication means is an n×n bit multiplier of an array type for generating a multiplication output data of (2n−1) bits having a sign bit M1 in the (2n−1)th bit position and a numeral section of the following (2n−2) bits.

3. A multiplication circuit according to claim 1 or 2, wherein said sign bit generating means comprises:
   an exclusive-OR cicuit for generating an output bit equal to the exclusive-OR of the sign $X_S$ of the multiplier X and the sign bit $Y_S$ of the multiplicand Y; and
   selecting means for generating an output bit "0" when the (2n−1)th bit M1 of the multiplication output data from said multiplication means is "0" and selecting an output bit of the exclusive-OR circuit when the (2n−1)th bit M1 is "1".

4. A multiplication circuit according to claim 3, wherein said selecting means comprises:
   an output node;
   a p-channel MOS transistor having a current path coupled between the output node and a ground point and a gate for receiving the (2n−1)th bit M1 of the multiplication output data from said multiplication means; and
   an n-channel MOS transistor having a current path coupled between the output node and the output terminal of said exclusive-OR circuit and a gate for receiving the (2n−1)th bit M1 of the multiplication output data.

5. A multiplication circuit according to claim 1 or 2, wherein said sign bit generating means comprises:
   a NAND circuit for receiving the sign bits $X_S$ and $Y_S$; and
   an AND circuit for receiving an output bit from said NAND circuit and the (2n−1)th bit M1 of the multiplication output data from said multiplication means.

* * * * *